(12) United States Patent
Barnett et al.

(10) Patent No.: US 7,398,216 B2
(45) Date of Patent: Jul. 8, 2008

(54) NETWORK DYNAMIC SERVICE AVAILABILITY

(75) Inventors: Janet A. Barnett, Pattersonville, NY (US); John A. Interrante, Schenectady, NY (US); Osmon R. Oksoy, Clifton Park, NY (US); Jesse N. Schechter, Niskayuna, NY (US); Bassel O. Williams, Albany, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 805 days.

(21) Appl. No.: 09/735,058

(22) Filed: Dec. 12, 2000

(65) Prior Publication Data

US 2002/0111814 A1 Aug. 15, 2002

(51) Int. Cl.
*G06Q 10/00* (2006.01)
(52) U.S. Cl. .......................................... 705/1; 709/201
(58) Field of Classification Search .............. 709/1, 709/201; 705/1
See application file for complete search history.

(56) References Cited

U.S. PATENT DOCUMENTS

| 5,930,511 | A | | 7/1999 | Hinsley |
| 5,991,808 | A | | 11/1999 | Broder et al. |
| 6,006,311 | A | * | 12/1999 | Arimilli et al. ............. 711/133 |
| 6,026,425 | A | | 2/2000 | Suguri et al. |
| 6,892,226 | B1 | * | 5/2005 | Tso et al. .................... 709/218 |

OTHER PUBLICATIONS

PineappleSoft, Jul. 1999, PineappleSoft OnLine.*
Schema For Representing CORBA Object References in a LD, Oct. 1999, Community.Roxen.Com.*
Network Local Balancing Technical Overview, Jan. 21, 2000, Microsoft Corporatoin.*
IBM DCE V3.1 For AIX and IBM DCE V3.1 For Solaris, Sep. 28, 1999, IBM Corporation.*
Jason Hunter, What's New In Java Servlet API 2.2?, Oct. 1999, JavaWorld.*
Installing NetCrusader/CORBA, 1999, Gradient Technologies, Inc.*
VM/ESA Open Edition DCE Introduction and Implementation Book, Dec. 1995, IBM Corporation.*
Information on PointCast Incorporated, 1999-2000, printed through www.archive.org.*
Westaim Technology Investment, Savvion, Debuts Mobile e-Business, Jun. 15, 2000, PR Newswire, p. 1.*
Pointsec Mobile Technologies Announces Availability to Pointsec 4.0, Nov. 27, 2000, PR Newswire, p. 1.*
3Com Unveils DynamicAccess Boot Services To Reduce Network Management Costs, Nov. 13, 2000, Business Wire, p. 1.*
Jini Network Technology, "Jini[tm] Technology Architectural Overview" (Jan. 1999).

* cited by examiner

*Primary Examiner*—Naresh Vig
(74) *Attorney, Agent, or Firm*—Scully, Scott, Murphy & Presser, P.C.

(57) ABSTRACT

A Jini™-based distributed computing platform architecture constructed to facilitate dynamic availability of eCommerce services over the Internet by which new services made available by a service provider are instantly accessible to a user through a web server.

7 Claims, 6 Drawing Sheets

NETWORK DYNAMIC SERVICE AVAILABILITY

RELATED APPLICATIONS

This application is related to U.S. patent application Ser. No. 09/735,060 filed concurrently herewith entitled EXECUTION OF DYNAMIC SERVICES IN A FLEXIBLE ARCHITECTURE FOR E-COMMERCE, by the same inventors as the present application and assigned to the same assignee as the present application, the entirety of which is hereby incorporated by reference.

BACKGROUND OF THE INVENTION

Present invention relates to web services, and more particularly relates to an architecture based on a distributed computing platform capable of arbiting dynamic availability of eCommerce services through a web browser.

Most services and pages available through the World Wide Web (WWW) today are accessed using the hypertext transfer protocol (http), which is a request/response protocol that defines how messages are formatted and transmitted and what actions web servers and browsers should take in response to various commands. The client browser typically requests access to a web site of a service provider by entering its URL, which provider responds by sending a set of instructions to the client which defines the service provider web page.

That is, the service provider responds by transmitting information for residence on the client browser (typically in the form of a client applet). The downloaded information, however, is static, i.e., any updates or changes must be provided by the service provider (end device) to the client in another information transfer and at the client's request for the http protocol.

Traditional distributed computer systems provide limited mechanisms for dynamically updating information in a user's browser window when connected to a service provider. When service offerings ("any exchange of information, on-line products, or services between a provider and an end user") change, or even when particular features of a service changes, a client may not see these changes due to a phenomenon known as browser caching.

More particularly, because data from a servlet sent from the service provider is "cached" in user's browser, it is not automatically updated with "new" service information when new services become available. The client, therefore, may be operating with obsolete data or an outdated service in the distributed computer system. More importantly, new services provided by the end device (service provider) are not to be visible (accessible) to the user until the page in the client's machine is reloaded via their web connection. In the fast-paced, ever changing world of electronic commerce, this is a crucial failing in systems today.

While traditional request/response interactions via the Internet are limited as described, the same limitations are found in an Intranet environment. In an effort to overcome such Intranet limitation, a software program or distributed computing platform, Jini™, by Sun Microsystems, has recently been implemented to simplify the network connection and sharing of services, i.e., printers, disc drives, etc. The Jini™ distributed computing platform performs Intranet tasks such as event notification, service registration, and dynamic downloading of software. Jini™ obviates the need, as in a conventional Java environment, for a user (client) to request a stub code update.

Jini™ is a distributed computing system which includes a connection technology that enables devices (of source providers) to plug and play together on a network. No driver or interface is needed on a client-based machine to run Jini™-controlled devices (that is, utilize any Jini™-based network service provider). The Jini™ system is Java-centric, assuming and requiring that communications between clients and services use a Java interface (RMI).

Such a Jini™-based network is shown in applicant's prior art FIG. 1. Therein, a client (User 1 or User 2) first locates which network service 110 it wishes to access using Jini's™ lookup server 100. The look-up server accesses a registry/locate service therein to determine user accessability. If accessible, the service provider interface is copied from the Jini™ lookup server 100 to the requesting user (client) where it will be used (e.g., Jini™ enabled devices 120). To do so, the Jini™ look-up server 100 prepares and passes snippets of code (which can be thought of as "device drivers" or client stubs) to the requesting client.

Every Jini™-enabled service (110 or 120) registers this driver with the lookup server when the service is initially made available. The lookup server provides any user client with the stub so that the client can directly access the service. Jini™ coordinates all devices/services to work together on demand in accordance with the code provided by the look-up server 100.

Once the network connection is made between user and device, the Jini™ lookup server 100 is not involved in subsequent transactions between that client (User 1 or User 2) and that network service (110 or 120). For example the client and end service device 120 would communicate directly after connected via Jini™. Jini™ provides everything needed by the client to utilize an Intranet end device 120 or service provider. Any computer that runs Java is able to access the data that passes among devices via Jini™.

Jini™ technology not only defines a set of protocols for discovery, join, and lookup, but also leasing and transaction mechanisms to provide resilience in a dynamic networked environment. Jini™ operates by exploiting the Java environment, with its portable byte code, dynamic downloading, and polymorphic object-oriented properties, essentially creating a distributed system (network). With the single, uniform Java environment, Jini™ allows code to be dynamically loaded into a running process irrespective of the underlying processor or operating system, exploiting the protocol-centric nature of distributed networks.

The Jini™ connection platform requires only that services 110 and devices 120 wishing to participate in the Federation or djinn (hardware or software) register at the Jini™ lookup service (and keep that registration alive through the renewal of leases). And while Jini™ has been proven to be beneficial in sharing resources in a Jini™-based network, no such system, with similar function and/or operation is known to exist for application outside of an Intranet world. For example, a mechanism where a client browser could be automatically updated by an Internet-based equivalent to a Jini™ look-up service via the net, by, for example, an eCommerce web server, would greatly enhance the web server's ability to communicate and/or interact with said web server.

THE OBJECTS AND SUMMARY OF THE INVENTION

It is therefore an object of this invention to provide a distributed computing architecture which may demonstrate dynamic availability of eCommerce or other services through a web browser.

It is another object of the invention to provide a web-based architecture which demonstrates dynamic availability of eCommerce or other services for sale via a web browser.

It is another object of this invention to provide a web-based architecture capable of rendering new services instantly accessible, that is, dynamically updating service availability.

It is another object of this invention to provide a web-based architecture capable of rendering instantly accessible new services to a user to ensure that the user is not working with outdated service provider applications.

It is another object of this invention to provide a web-based architecture capable of rendering instantly accessible payment services, user profiling services, reporting services, fulfillment status services, etc., by a service provider to a client with which it is communicating.

To that end, an architecture is disclosed herein and referred to as the "eCommerce Software Platform" which demonstrates dynamic availability of eCommerce services, particularly services for sale, through a web browser. The eCommerce Software Platform architecture of this invention is facilitated by the Jini™ distributed computing platform which provides the infrastructure needed to perform tasks such as remote event notification, services registration, dynamic downloading of software, etc., between clients and service providers through use of the inventive architecture. The ultimate goal of the architecture disclosed herein is to provide dynamic access to services from anywhere at anytime.

For example, new services made available by an end service provider are instantly accessible by authenticated users utilizing the inventive Jini™-based architecture disclosed herein. Services that change are automatically updated at the user's browser (via a client applet) so that the user is not working with outdated applications. Perhaps more importantly, eCommerce related services, such as payment services, user profiling, reporting, fulfilment status, sales of software, or other products, as well as the implementation of a variety of payment models provides for transactions and dynamic pricing within a generic Jini™ framework, etc., may all be easily made available to the user via a client applet through the inventive eCommerce Software Platform architecture disclosed herein.

The reader should note that services may be aware of each other, and may also negotiate with each other based on user direction or service-specific constraints. For example, a service provider can state which payment mechanisms he/she is willing to accept, while an end user may also state which payment systems he/she is willing to use. Thus, negotiations must occur in order to settle on an appropriate selection of payment schemes that are acceptable to both parties.

BRIEF DESCRIPTION OF THE DRAWING FIGURES

DETAILED DESCRIPTION OF THE PREFERRED EMBODIMENTS

The eCommerce architecture disclosed herein provides a network dynamic service ability in a web-based environment, particularly services for sale through a web browser. The architecture utilizes the capabilities provided by the Jini™ distributed computing system. The reader should note, however, that while Jini™ is described herein as creating a distributed environment for implementation of this invention, Jini™ is referred to for exemplary purposes only, and is not meant to limit the inventive concept in any way. Any distributed computing system known to those skilled in the art to enable operation of the architecture disclosed and claimed herein may be implemented without departing from the scope or spirit herein (e.g., CORBA).

Jini™'s network based design provides for several functions which prove to be quite useful in eCommerce applications, particularly their flexibility, but is in no way the only distributed computing platform in which the architecture disclosed herein may be implemented.

Figure 1:
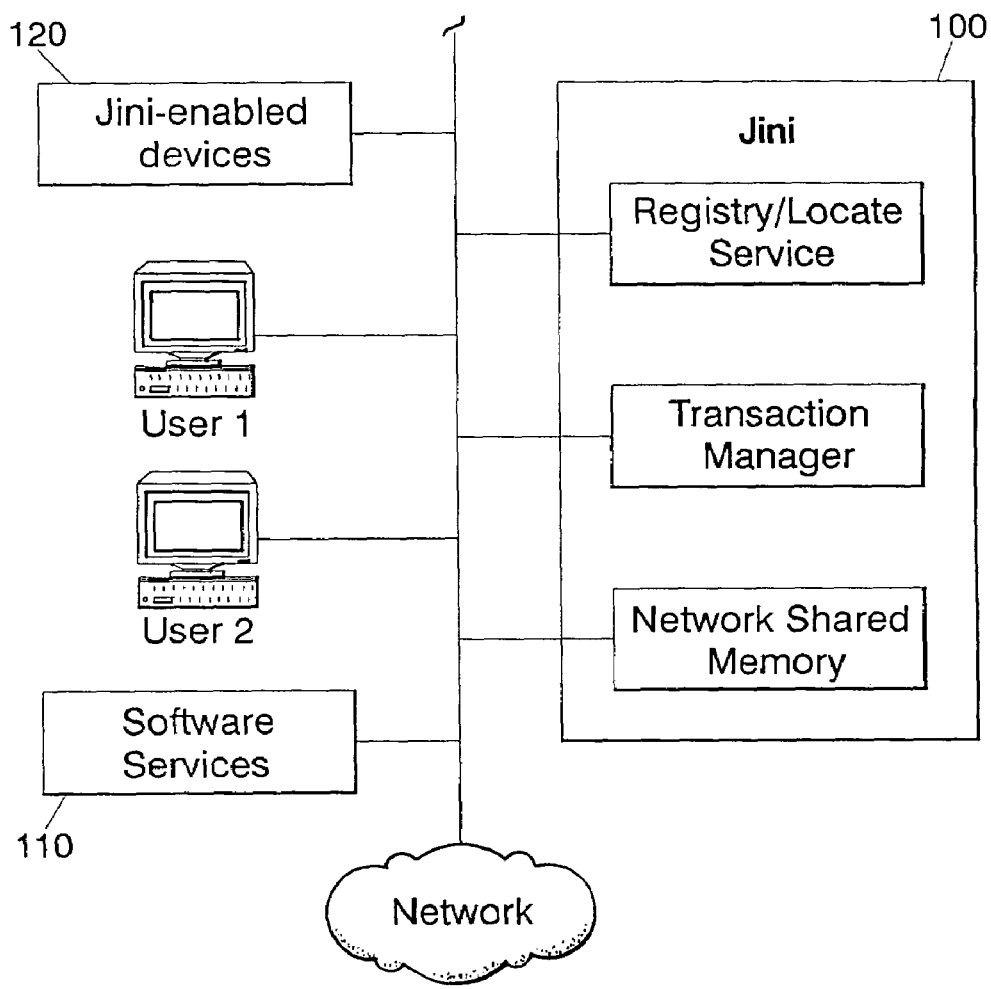
FIG. 1 is a diagram depicting a known Jini™ network.
Figure 2:
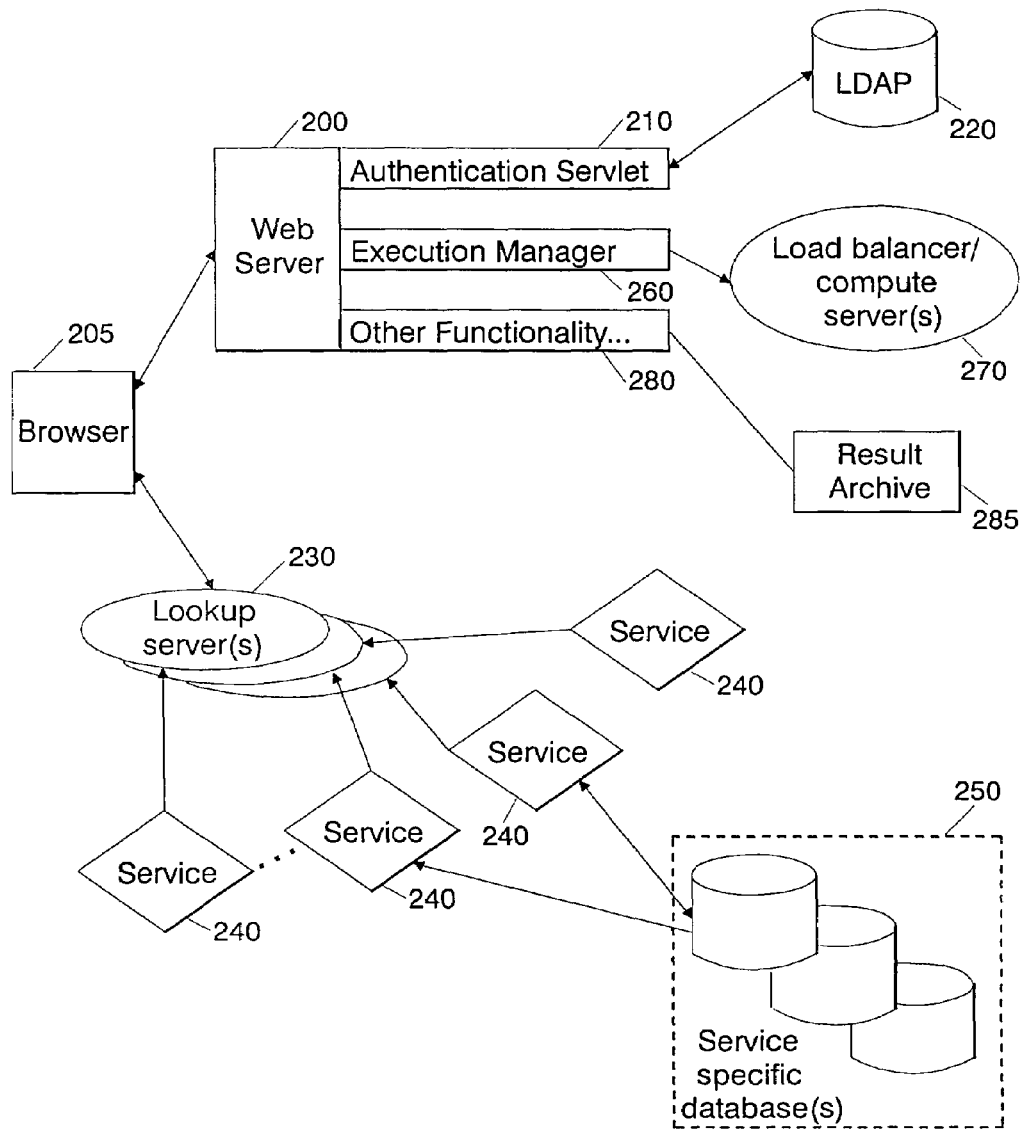
FIG. 2 is a schematic diagram depicting a Jini™-based architecture of the present invention.

A high level diagram of a system which implements the eCommerce Software Platform architecture of this invention is shown in FIG. 2. FIG. 2 depicts a web server 200 in communication through the Internet (not shown) with a browser (user) 205. The reader should note that web server 200 as depicted in FIG. 2 is merely an exemplary embodiment of an eCommerce service provider for linking the user to the eCommerce services for which it has access, including "new" services. The user interacts with a client applet, providing the user's credentials (e.g. user name and password) to the web server 200. That is, when a user logs in to the web server 200 (an eCommerce service provider), a variety of data about the user is passed to the client applet, e.g., the groups the user belongs to, a directory path for storage or results, and a user e-mail address.

An authentication servlet 210 is used by the web server to identify and compare user information provided by the client applet to authentication information stored locally, e.g. in a Lightweight Directory Access Protocol (LDAP) directory 220. This could be extended so that other data could easily be added to the LDAP directory and returned for use by the client applet. The authentication servlet 210 returns the client applet to the user 205 with user information. LDAP directory 220 is typically used for storing information about people (organizational information, authentication information, etc.).

The reader should note that the LDAP directory is utilized herein for exemplary purposes only, and is not meant to limit the invention. Any data store, e.g., database, could be substituted for the LDAP herein without departing from the scope or spirit of the invention.

Access control is performed based on the notion of groups (or roles) of users. A variety of groups may be stored within LDAP directory 220 and users can be associated with one or more of these groups. The reader should note that the client user interface (UI) may be run either through the web browser as an applet or as a stand alone application. The client applet is accessed from a secure web page. Any user who wants to use the inventive architecture must first log in through a standard HTML page.

The services 240 that appear on the UI screen are those that user has received authorization to access. The services 240 are those that are registered under the groups to which the user belongs. Lookup Servers 230 act as a registry for tracking all available services that share the same group identification.

The client applet is structured so that services 240 to which the user has access automatically appear on the UI screen.

These services are dynamic. If a new service is created and started while the user is working, and the user has permission to access that service, it will appear in the client applet. Conversely, if a service 240 becomes unavailable during the user's session, access to that service will disappear from that client applet only if it is a "remote" service. Local services have the ability to be completely downloaded to the client so they don't need to go away from the UI if they vanish from the server. This dynamic feature is one of the primary benefits of using the eCommerce Software Platform of the present invention as the infrastructure for eCommerce services.

As mentioned, when the user via browser 205 gains access to the web server 200 after logging in, group information is provided to the client applet from the LDAP 220. Lookup Server(s) 230 provide an interface between users allowed to access group information thereby determining which services 240 are available. For example, the client may wish to access or utilize a specific database 250 registered with Lookup server 230.

ExecutionManager 260 is a servlet which provides a mechanism for all services to run. In particular, the ExecutionManager 260 listens for communications from the client applet and if it reads a valid Executable, the ExecutionManager passes it to a LoadBalancer/ComputeServer(s) 270. The ExecutionManager 260 also uses the LookupFinder class to find the available LoadBalancers to execute computationally intensive jobs. ExecutionManager also utilizes a ServiceFinder class to find ComputeServers. If there is an error reading the Executable, an error message is returned to the client applet. When the ExecutionManager has read a valid Executable, it attempts to pass it to the LoadBalancer/ComputeServers (270 of FIG. 2).

More particularly, LoadBalancer 270 maintains a list of registries (lookup servers not expressly shown in 270 of FIG. 2) it finds when it registers itself, and uses all available ComputeServers available to a LoadBalancer for a job. Information about the owner of the Executable is provided by other functionality 280 and stored via a "Result" object in a Result archive 285. For example, a ResultsManager object may combine the information ("Result") with the job ID to create a unique path (URL) to the Result, sent to the user via e-mail.

The LoadBalancer/ComputeServer 270 passes the job to the most eligible ComputeServer (not shown in 270 of FIG. 2), and identifies the ComputeServer to pass the next job to based on the total amount of time each ComputeServer of the distributed system has spent on the jobs, or based on the last time a ComputeServer completed a job (these are configurable options).

If no LoadBalancer 270 is available, the ExecutionManager 260 returns a diagnostic message to the client applet, otherwise it invokes the LoadBalancer's run job method with the Executable as a parameter. If the LoadBalancer 270 run job is successfully passed to the LoadBalancer/ComputeServer(s) 270, the job is given a unique job I.D. that is returned to the client applet and passed along with the Executable for identification purposes.

As described above in detail, to ensure user access to services for which they have permission to use, a client applet is provided to the client and protected by a login screen. While the current implementation utilizes user ID/password for authentication, any authentication scheme known to those skilled in the art could be integrated within the architecture of this invention (i.e., securID, digital certificates, etc.).

Figure 3:
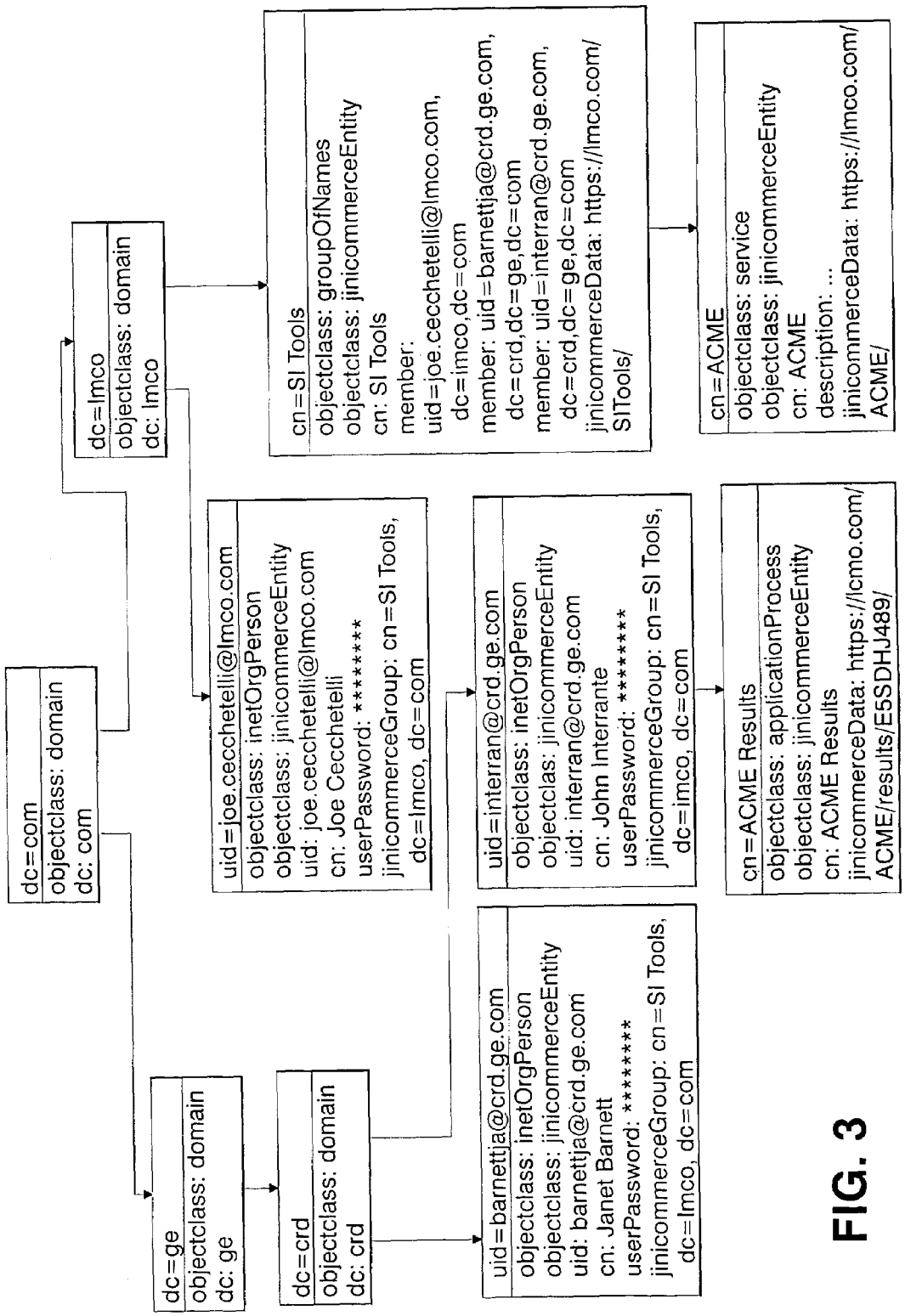
FIG. 3 is a class diagram depicting the relationship between users and groups.

Directory information is stored in such a way as to easily update user information as well as group information. FIG. 3 is a class diagram which highlights the distinguished names for users within multiple companies. The FIG. 3 diagram shows the relationships between users and groups, as well as the relationship to the results file system directory, where a user's processing results are stored.

Because some of the services provided by the eCommerce Software Platform architecture may generate significant amounts of data, access to such data is provided through a secure web page. The URL to the Web page is sent to the user when the processing for their job has been completed. This can be provided, at the user or group levels. The user can state a preference for how broadly available they would like to make their Result (just to themselves or to their group) or anyone in their same role. Note that this is a service-dependent feature, that each service can provide this capability, if appropriate. In addition, it is possible to have results either e-mailed directly to the user or placed on a secure web site based on user preference.

As was described in the login procedure, users may belong to one or more groups. These groups are used to define access control to applications.

Figure 4:
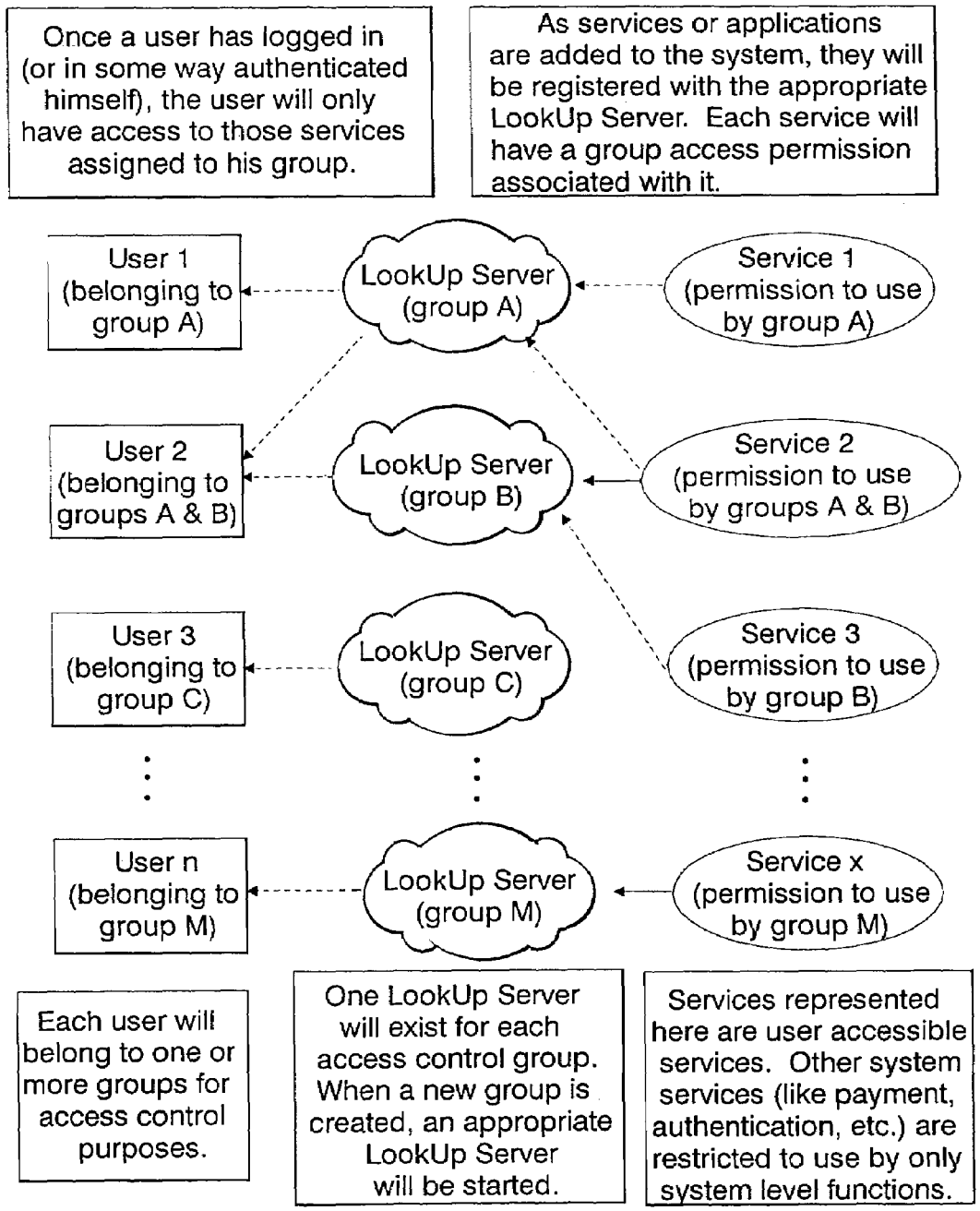
FIG. 4 is a diagram showing an architecture used to impose access control restrictions.

FIG. 4 is a diagram showing a more complete architecture used to impose access control restrictions. A user's group information is stored in the LDAP database along with other personal information such as authentication information, address information, phone number, etc. When a user gains access to the client applet after logging in, the system may use that information to determine which services to display. The client uses the group information to locate eCommerce Software Platform Lookup Servers that service those groups.

When a user double clicks on any service, that service's user interface will appear in the upper right portion of the screen. Payment information is collected somewhat independently in the lower portion of the screen. Note that a service consists of two parts: an actual application, and a user interface. The user interface is a Java class (sub-classed from ServiceInputPanel).

When the service is loaded in the client applet, this user interface is loaded as well. That is, code may be dynamically relocated from one node on a network (a server in this case) to another node (to the client applet in this case). Hence, software for any service can be updated whenever it is needed. The next time that service is requested by a user, the user has access to the latest version of the software.

Such an operation might be accomplished using mechanisms other than Jini™ (e.g., CORBA), but the software tends to be much more complicated to develop. Jini™ and the eCommerce Software Platform architecture disclosed herein provides a simple infrastructure for supporting distributed software systems.

Two different types of services may be implemented by the eCommerce Software Platform architecture of this invention. The types are different from an implementation perspective. One: any service sub-classed from LocalService functions by downloading the entire object needed for execution of the service. Hence, no portion of the service is resident on any server. Such condition implies fairly limited functionality for the service because it cannot access service specific databases, or perform any remote processing.

The second type of service is defined as any service subclasses from RemoteService. These RemoteService subclasses have two components: one that is downloaded to the client applet, and one that remains on the server. This is useful when service specific databases are needed, when processing power/memory size of the entire server is needed, and when other remote information (data) needs to be accessed. It is also useful when the service is too large to download to the client easily. It should be noted that remote data should not be accessed directly from the client applet due to processing limitations and consistency with possible firewall restrictions.

EXAMPLE 1

| SI-Tools | S&LG | Admin |
|---|---|---|
| Acme (DVD) | Ticket Payment<br>Birth Certificate<br>Dog License renewal<br>Motor vehicle registration | Admin |

The ExecutionManager 260 (FIG. 2) provides the mechanism for all services to actually run. The primary goal of the ExecutionManager (and associated code modules) is to handle distribution of compute-intensive jobs across varied ComputeServers. As part of supporting web-based access to the SI-Tools in Example 1, need exists for handling this type of computation.

The ExecutionManager 260 also serves as the means of processing all services via ComputeServers (not shown in the figure), including those services that may only involve payment transactions and other simple computations. As long as the overhead involved with the ExecutionManager 260 is low, which applicant's use of the invention as preferred clearly supports, this processing mechanism is sufficient for services implemented by any ComputeServer available by LoadBalancer/ComputeServer 270. However, one skilled in the art may readily investigate distinguishing which services need the use of this execution mechanism versus running immediately outside the environment.

Other criteria for selecting a ComputeServer could easily be implemented and added to the inventive architecture (system). The ComputeServer runs the Executable by invoking its runMe method, which will return a "Result". Once the ComputeServer has updated its own statistics, such as time running and jobs completed, it passes the Result to the ExecutionManager 260.

Information about the owner of the Executable is stored in a Result object in a JobInfo field, and the ExecutionManager 260 combines this information with the JobID to create a unique path to the Result. The unique path, that is, the Result location, is sent to the user in e-mail. The user must re-authenticate with the system before accessing the Result, which is stored in an HTML file that is only accessible through a ResultFinder servlet (in Result archive 285).

The ResultFinder servlet first requests the user name and password before displaying the Result. The only entities allowed to access the Result are the user alone, if user-only access is specified, or members of a specific group if user specified group level access is specified.

While Jini™, and, therefore, the eCommerce Software Platform architecture disclosed herein, are not presently scalable to large numbers of users and large numbers of services, one skilled in the art may readily construct the invention to be more scalable and able to support greater numbers of users and services (Compute Servers).

A second Jini™ related issue addressed by the architecture provided herein arises from security concerns. Because Jini™ is built entirely on Java and RMI, reasonable levels of security for Jini™ may be readily realized by one skilled in the art. Secure RMI implementation for use herein is readily achievable by those skilled in the art such that secure Jini™ implementations, based on RMI security, are available.

Figure 5A:
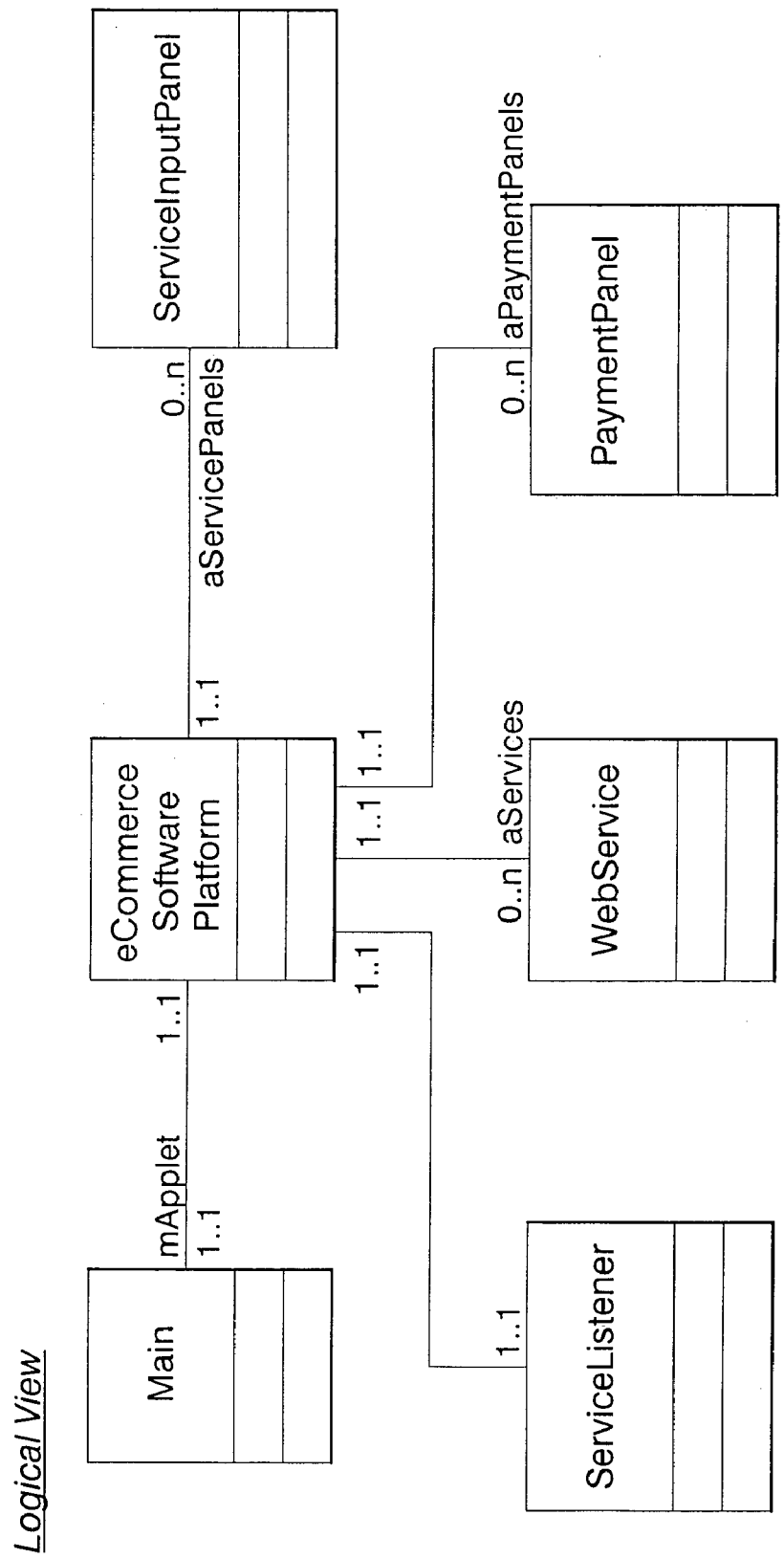
FIG. 5A is a class diagram depicting a logical view of an architecture of the present invention.
Figure 5B:
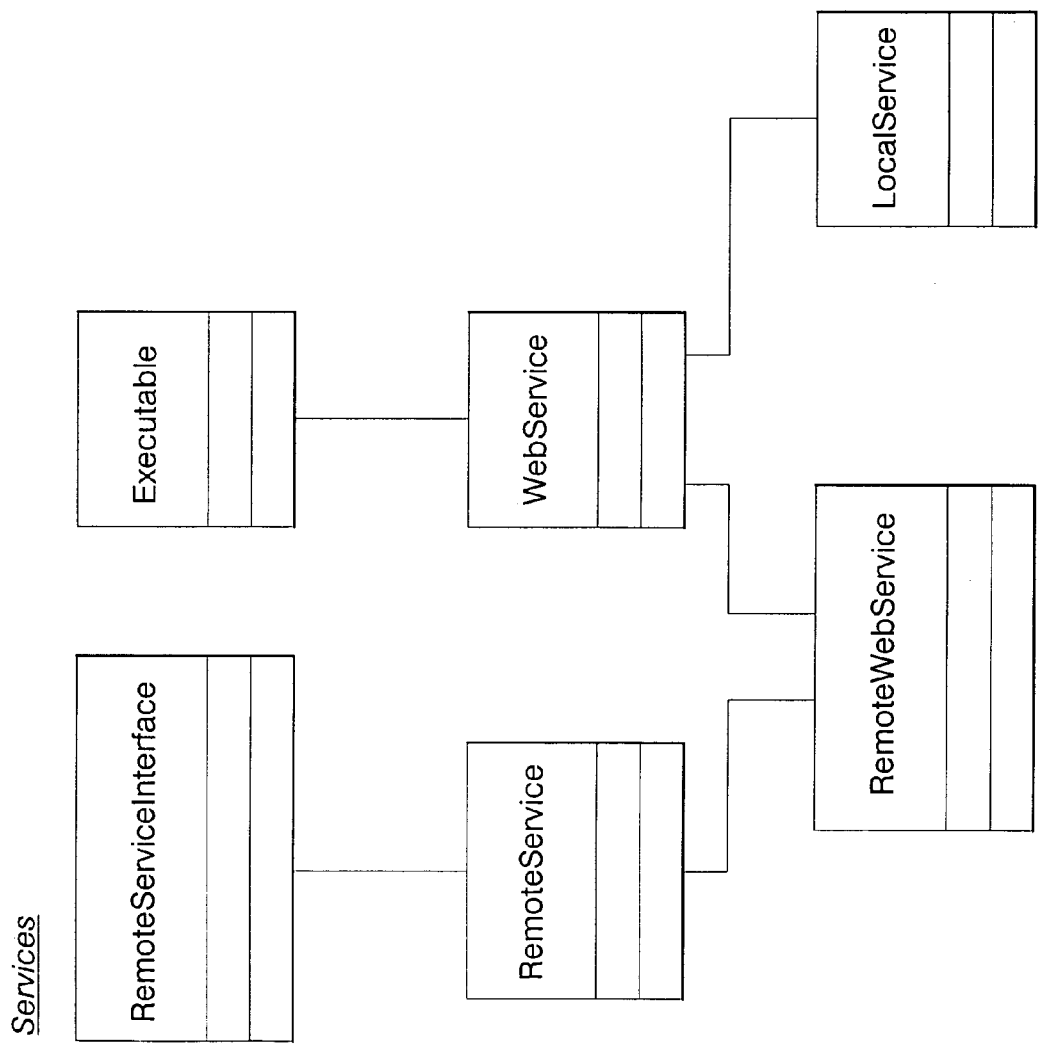
FIG. 5B is a class diagram depicting a services view of an architecture of the present invention.

The reader's attention is now directed to FIGS. 5A and 5B. FIGS. 5A and 5B are class diagrams (UML) for a preferred architecture of the present invention. FIG. 5A presents a logical view; FIG. 5B presents a Services view.

Finally, several eCommerce Software Platform class definitions are provided below.

Authentication and Access Control

AddGroup—The servlet used to add a new group to the LDAP database.

AddUser—The servlet used to add a new user to an LDAP database.

Admin—The base servlet that encapsulates common instance variables and methods used by all the database administration servlets.

DeleteGroup—The servlet used to delete an existing group from the LDAP database.

DeleteUser—The servlet used to delete an existing user from the LDAP database.

EditGroup—The servlet used to edit the attributes of an existing group from the LDAP database.

EditUser—The servlet used to edit the attributes of an existing user from the LDAP database.

ListGroups—The servlet used to list all groups in the LDAP database.

ListUsers—The servlet used to list all the users in the LDAP database.

Login—The class used to authenticate the administrative user. The user will have the ability to add, edit, delete, list users and groups.

AuthenicationException—The exception that is executed if there is a problem when a user tries to login.

LoginHandler—The servlet that authenticates a username and password. After authentication, the appropriate arguments for that user are passed to the client interface applet.

Client Interface eCommerce Software Platform—The main application class which contains the code for constructing the graphical user interface (GUI). It registers itself as a DiscoveryListener to discover new Lookup Servers is responsible for submission of services for execution.

Main—The start up class which is responsible for setting up all appropriate arguments runs as either an application or an applet.

NetConnection—The class used to connect the client interface to the execution servlet, using HTTP protocol to tunnel between firewalls. If the servlet uses https protocol, the transmission will be secured using SSL.

PaymentPanel—The base class for all payment panels such that any payment interface will have to subclass this class in order to integrate with the GUI.

ServiceInputPanel—The abstract base class for all service input panels such that any services which wish to have an input panel that can be integrated with the main GUI.

ServiceListener—The helper class that listens for new services registering with a Lookup Server.

ServiceListener_Stub—The remote method stub for the ServiceListener class.

StatusBar—Class used to dipolar a status bar on the GUI.

ExecutionManager

Executable—Executable is the base interface for all services that can be run by another service. This interface defines the basic signature for methods that Executable objects must have, like runMe. All services run by the system implement this interface either directly or indirectly.

WebService—WebService is an interface that extends Executable and includes methods that are required by the client applet to display a service and prepare it to be sent to the ExecutionManager.

LocalService—LocalService implements WebService and is the base class for all services offered through the eCommerce Software Platform system. It is referred to as "local" because it registers a copy of itself, not a proxy to a remote object, with Lookup Servers. The copy can then be run locally by a ComputeServer, or any other service interested in using the LocalService implementation.

RemoteService—RemoteService is a base class for services that need to run on a specific machine, like the LoadBalancer and ComputeServers. These services register only a proxy of themselves, which, when used, the object is run in the JVM in which it was started, not the one in which the calling service runs. These services run on standard Java RMI.

RemoteServiceInterface—Remote objects require an interface that defines the methods available remotely. RemoteServiceInterface is the type of interface for RemoteService objects.

RemoteWebService—RemoteWebService is an abstract class that extends RemoteService and implements WebService, and is used to create services that have a local part and a remote part. An example might be a service that needs to access a database on a particular machine for data, but would then run local to a ComputeServer after the data was collected.

RemoteServiceAdmin—RemoteServiceAdmin defines a GUI for RemoteServices, like the LoadBalancer and ComputeServer, that allows the service to be registered, unregistered and exited. The status of the service is displayed in the text window.

ComputeServer—ComputeServers run on a specific machine and make themselves available to run executable objects by registering with Lookup Servers. ComputeServers are expected to keep statistics about their own history of running Executables. These statistics are used by the LoadBalancer.

ComputeServerInterface—ComputeServerInterface extends RemoteServiceInterface and defines the methods that ComputeServers make available as remotely invokable.

ComputeServerAdmin—ComputeServerAdmin adds little functionality to RemoteServiceAdmin, but is customized to work with ComputeServers.

LoadBalancer—LoadBalancer objects discover all available ComputeServers at a specific point in time and use one of several criteria to select the most eligible ComputeServer to run a specific job. Only one ComputeServer need be running at a time unless the system is overloaded.

LoadBalancerInterface—LoadBalancerInterface extends RemoteServiceInterface and defines methods specific to LoadBalancers that can be remotely invoked.

LoadBalancerAdmin—LoadBalancerAdmin customizes the RemoteServiceAdmin and adds the ability to select which criteria to use to select ComputeServers.

Result—Result interface defines methods for objects that hold information about the results of a job and about the job itself.

GenericResult—GenericResult is a basic implementation of Result that holds a JobInfo object and a String object that represents the results of a job.

ResultsManager—ResultsManager is a Java servelet that takes a Result object from a ComputeServer after a job has been completed and prints the results in a unique file in the results area.

ResultFinder—ResultFinder is a Java servelet that authenticates a user and displays results to authorized users.

ExecutionManager—ExecutionManager is a servelet that allows a constant point of entry for the client applet. The ExecutionManager reads in an executable object from the client applet and passes it to a LoadBalancer. The LoadBalancer is found through a Lookup Server.

JobInfo—JobInfo holds information about a specific Executable, including which user requested it to run, the groups the user belongs to, as well as the user's e-mail address.

LookupFinder—LookupFinder is a helper class that encapsulates the commands necessary to find Lookup Servers. LookupFinder uses the LookupDiscovery class that accompanies Jini™.

ServiceFinder—ServiceFinder is a helper class that encapsulates the commands necessary to find services through Lookup Servers. ServiceFinder uses the ServiceTemplate and ServiceMatches classes accompanying Jini™.

It is thus believed that operation and construction of the present invention will be apparent from the foregoing description. While the method, apparatus and system shown and described has been characterized as preferred, it will be readily apparent that various changes and modifications could be made therein without departing from the scope and spirit of the invention as defined by the following claims.

What is claimed is:

1. A distributed computing system constructed to facilitate a dynamic availability of an eCommerce service to a user over the Internet, comprising:

a web server in communication with a browser of a user, the web server configured to authenticate the user and to communicate group information to the browser of the user;

means for providing the eCommerce service to the browser, said browser configured to communicate said group information to a Lookup Server; and said Lookup Server configured to act as a registry for tracking at least one eCommerce service available to the user and, in response to said group information, said Lookup Server configured to provide dynamic updates to the browser of new and/or updated eCommerce service, until said browser logs off said web server.

2. The distributed computing platform of claim 1, wherein said eCommerce service is comprised of at least one of:
a) remote event notification for commercial transactions;
b) service registration; and
c) dynamic downloading of software from anywhere at anytime.

3. The distributed computing platform of claim 1, wherein said eCommerce service includes use of a variety of payment models, further facilitating commercial transactions and dynamic pricing.

4. The distributed computing platform of claim 1, wherein user access to the eCommerce service registered with said web server is controlled by exchange of a client applet between the user and said web server.

5. The distributed computing platform of claim 4, wherein user information received from the user is compared by said web server with corresponding user information stored in a lightweight directory access protocol (LDAP) database.

6. The distributed computing platform of claim 1, wherein said web sewer provides for the sale of commercial software products.

7. The distributed computer platform of claim 1, wherein said platform is Jini based.

* * * * *